United States Patent Office 3,792,038
Patented Feb. 12, 1974

3,792,038
CARDIO-ACTIVE CARDENOLIDE RHAMNOSIDES
Johannes Hermann Hartenstein, Wittental, Gerhard Satzinger, Denzlingen, and Manfred Franz Herrmann, Gundelfingen, Germany, assignors to Warner-Lambert Company, Morris Plains, N.J.
No Drawing. Filed Apr. 9, 1973, Ser. No. 349,513
Int. Cl. C07c 173/02
U.S. Cl. 260—210.5                          5 Claims

ABSTRACT OF THE DISCLOSURE

The present invention relates to new cardio-active cardenolide rhamnosides of the General Formula I

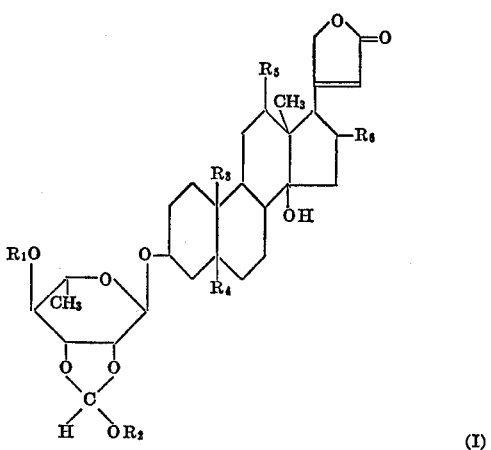

wherein $R_1$ represents hydrogen, methyl, ethyl, or the acyl residue of a carboxylic acid having from 1 to 4 carbon atoms, the acyl residue being substituted by a methoxy or ethoxy group, if present, $R_2$ represents a lower alkyl residue, $R_3$ represents methyl, formyl, or hydroxymethyl, $R_4$ represents hydrogen or hydroxyl, and $R_5$ and $R_6$ represent hydrogen, hydroxyl or acetoxy.

DESCRIPTION OF THE INVENTION

The present invention relates to new cardio-active cardenolide rhamnosides of the General Formula I

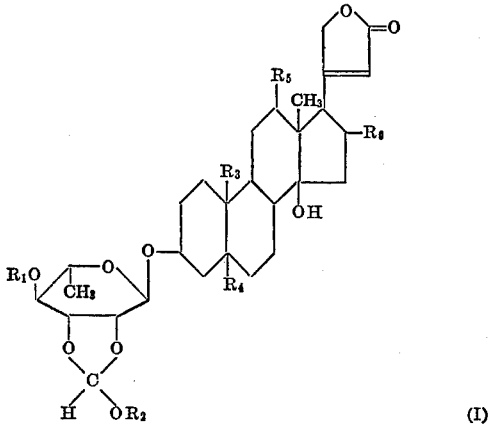

wherein $R_1$ represents hydrogen, methyl, ethyl, or the acyl residue of a carboxylic acid having from 1 to 4 carbon atoms, the acyl residue being substituted by a methoxy or ethoxy group, if necessary, $R_2$ may represent a lower alkyl residue, $R_3$ represents methyl, formyl, or hydroxymethyl, $R_4$ represents hydrogen or hydroxyl, and $R_5$ and $R_6$ represent hydrogen, hydroxyl or acetoxy.

The compounds of the present invention are obtained by reacting cardenolide rhamnosides of the General Formula II

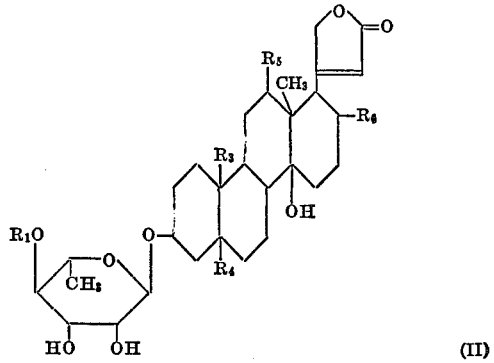

wherein $R_1$ as well as $R_4$, $R_5$ and $R_6$ have the meanings given above, and $R_3$ represents CHO or $CH_3$, with a trialkyl orthoformate in the presence of an acid catalyst. In case $R_3$ represents CHO, the compounds formed may subsequently be transformed to the methylol compounds in the usual manner, e.g., by treatment with lithium-tri-t-butoxy-aluminumhydride, and where $R_1$ is H, they may be alkylated or acylated in known manner.

The reaction is conveniently performed in a neutral, aprotic solvent as, e.g., tetrahydrofuran, dioxane, dimethylformamide or chloroform, at room temperature or at moderately increased temperatures.

Suitable acid catalysts are inorganic or organic acids as, for example, ethereal hydrochloric acid, sulfuric acid and 70% perchloric acid or sulfonic acids such as p-toluenesulfonic acid or in the form of ion exchange resins. Suitable ion exchange resins are preferably the commercially available sulfonated polystyrene resins of the Dowex, Amberlite or Lewatit type in the acid form such as Amberlite IR-120, Dowex 50W or Lewatit S 1020.

As suitable starting compounds of General Formula II there enter into consideration, for example:

Convallatoxin ($R_1$=H, $R_3$=CHO, $R_4$=OH, $R_5$=$R_6$=H);
Periplorhamnoside ($R_1$=H, $R_3$=$CH_3$, $R_4$=OH, $R_5$=$R_6$=H);
Evomonoside ($R_1$=H, $R_3$=$CH_3$, $R_4$=H, $R_5$=R =H);
Rhodexin B ($R_1$=H, $R_3$=$CH_3$, $R_4$=$R_5$=H, $R_6$=OAc);
Digoxigenin rhamnoside ($R_1$=H, $R_3$=$CH_3$, $R_4$=H, $R_5$=OH, $R_6$=H);
Gitoxigenin rhamnoside ($R_1$=H, $R_3$=$CH_3$, $R_4$=H, $R_5$=H, $R_6$=OH)

In the literature, for example, German Pat. No. 2010422, orthoacetates of cardenolide-digitoxosides have already been described as intermediates for the preparation of α acetyldigitoxosides. Surprisingly, the orthoformates of the present invention are distinguished from the orthoacetates, by an increased stability so that as such they can be used as stable rhamnoside-derivatives of the cardenolides mentioned for the therapy of cardiac insufficiency. In contrast to this the respective orthoacetates of the rhamnosides cannot be isolated under the stated conditions of reaction according to our own observations, but rearrange to a mixture of normal acetates.

The compounds of the present invention exert, as the basic, unsubstituted cardenolide rhamnosides, a strong, positive inotropic effect, on the myocardium of various kinds of mammals but have, surprisingly, a more favorable ratio of enteral to parenteral effectiveness. For the therapy of cardiac and circulatory diseases they can be utilized in the form of either orally administered or injectable preparations. For that purpose they are processed with the excipients and adjuvants usually employed in formulating pharmaceuticals and subsequently processed

EXAMPLE 1

2',3'-O-ethoxymethylene-convallatoxin 550 mg. of convallatoxin are dissolved in 9 ml. of absolute dioxane, mixed with 1 ml. of triethyl orthoformate and 20 mg. of p-toluene-sulfonic acid monohydrate. The mixture is allowed to stand at room temperature for 20 minutes, neutralized with 5% aqueous $NaHCO_3$ solution and extracted with chloroform. After drying and evaporation under reduced pressure the residue is chromatographed on silica gel. Elution with chloroform/methanol (98:2) affords 433 mg. of a white foam 246 mg. of colorless crystals are obtained from methanol/ether. M.P. 213°–216° C.

$C_{32}H_4O_{11}$.—Cal'd (percent): C, 63.35; H, 7.64; O, 29.11. Found (percent): C, 63.16; H, 7.78; O, 29.17.

EXAMPLE 2

4'-O-acetyl-2',3'-O-ethoxymethylene-convallatoxin 210 mg. of 2',3'-O-ethoxymethylene-convallatoxin (see Example 1) are mixed with 5 ml. of pyridine and 1 ml. of acetic anhydride. The mixture is allowed to stand at room temperature for 3 hours and is subsequently poured into ice-cold 5% aqueous $NaHCO_3$-solution and extracted with chloroform. Processing and chromatography as in Example 1 produce 180 mg. of a white foam which is reprecipitated from benzene/hexane. M.P. 136°–140° C.

$C_{34}H_{48}O_{12} \cdot \frac{1}{2} H_2O$.—Calc'd (percent): C, 62.09; H, 7.51; O, 30.40. Found (percent): C, 62.19; H, 7.42; O, 30.38.

EXAMPLE 3

4'-O-formyl-2',3'-O-ethoxymethylene-convallatoxin 400 mg. of 2',3'-O-ethoxymethylene-convallatoxin (see Example 1) are dissolved in 10 ml. of pyridine and mixed dropwise with 2 ml. of a 1:1 mixture of formic acid and acetic anhydride while cooling with ice. The mixture is stirred for 3 hours at 0° C. under nitrogen. Subsequently 30 ml. of a 5% aqueous $NaHCO_3$-solution are added and this mixture is extracted with chloroform. After usual work-up and chromatography on deactivated silica gel 182 mg. of white amorphous powder are obtained. M.P. 132°–135° C.

$C_{33}H_{46}O_{12} \cdot \frac{1}{2} H_2O$.—Calc'd (percent): C, 61.58; H, 7.36; O, 31.06. Found (percent): C, 61.75; H, 7.43; O, 30.91.

EXAMPLE 4

2',3'-O-methoxymethylene-convallatoxin 550 mg. of convallatoxin are dissolved in 9 ml. of dioxane and mixed with 1 ml. of trimethyl orthoformate and 20 mg. of p-toluene-sulfonic acid monohydrate. The mixture is allowed to stand at room temperature for 30 minutes and is then processed as described in Example 1. Chromatography on silica gel produces 450 mg. of TLC-homogeneous product as a white foam which crystallizes from methanol/ether (242 mg.). M.P. 230–232° C.

$C_{31}H_{44}O_{11}$.—Calc'd (percent): C, 62.82; H, 7.48; O, 29.70. Found (percent): C, 62.72; H, 7.36; O, 29.93.

We claim:
1. The cardio-active cardenolide rhamnosides of the following formula

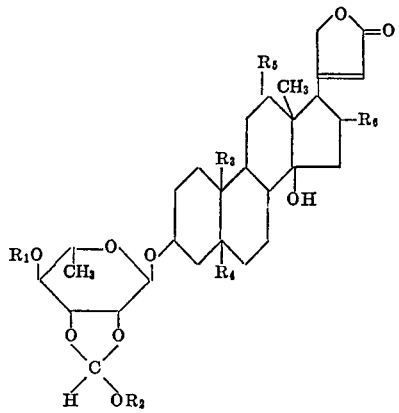

wherein $R_1$ represents hydrogen, methyl, ethyl or the acyl residue of a carboxylic acid with 1 to 4 carbon atoms, the acyl residue of which may be further substituted by a methoxy or ethoxy group, $R_2$ represents a lower alkyl residue, $R_3$ is methyl, formyl, or hydroxymethyl, $R_4$ is hydrogen or hydroxyl, and $R_5$ and $R_6$ are hydrogen, hydroxyl, or acetoxy.

2. 2',3'-O-ethoxymethylene-convallatoxin.
3. 4'-O-acetyl-2',3'-O-ethoxymethylene-convallatoxin.
4. 4'-O-formyl-2',3'-O-ethoxymethylene-convallatoxin.
5. 2',3'-O-methoxymethylene-convallatoxin.

References Cited
UNITED STATES PATENTS 3,732,203   5/1973   Stache et al.   260—210.5
3,740,390   6/1973   Heider et al.   260—210.5

LEWIS GOTTS, Primary Examiner

C. B. OWENS, Assistant Examiner

U.S. Cl. X.R.
424—182